(12) United States Patent
Arai (10) Patent No.: US 11,354,849 B2
(45) Date of Patent: Jun. 7, 2022

(54) INFORMATION PROCESSING APPARATUS, INFORMATION PROCESSING METHOD AND STORAGE MEDIUM

(71) Applicant: CANON KABUSHIKI KAISHA, Tokyo (JP)

(72) Inventor: Tomoaki Arai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/554,684

(22) Filed: Aug. 29, 2019

(65) Prior Publication Data
US 2020/0082603 A1 Mar. 12, 2020

(30) Foreign Application Priority Data

Sep. 7, 2018 (JP) .............................. JP2018-167879

(51) Int. Cl.
*G06T 15/20* (2011.01)
*G06T 3/20* (2006.01)
(Continued)

(52) U.S. Cl.
CPC .............. *G06T 15/20* (2013.01); *G06F 3/013* (2013.01); *G06T 3/20* (2013.01); *G06T 7/70* (2017.01); *G06T 19/006* (2013.01); *H04N 5/23216* (2013.01); *H04N 5/23219* (2013.01); *H04N 5/23229* (2013.01); *H04N 5/23293* (2013.01); *H04N 5/247* (2013.01); *G06T 2207/20101* (2013.01)

(58) Field of Classification Search
None
See application file for complete search history.

(56) References Cited

U.S. PATENT DOCUMENTS 9,342,925 B2 * 5/2016 Fujiwara ................. G06T 15/20
10,449,900 B2 10/2019 Higuchi
(Continued)

FOREIGN PATENT DOCUMENTS

CN 103150009 A 6/2013
CN 106464847 A 2/2017
(Continued)

OTHER PUBLICATIONS

Office Action issued in Chinese Appln. No. 201910841881.2 dated Aug. 24, 2021. English translation provided.
(Continued)

*Primary Examiner* — James M Anderson, II
(74) *Attorney, Agent, or Firm* — Rossi, Kimms & McDowell LLP (57) ABSTRACT

An information processing apparatus that controls a virtual viewpoint corresponding to a virtual viewpoint image to be generated based on a plurality of images obtained by capturing an image capturing-target area from directions different from one another by a plurality of image capturing apparatuses and includes: a first acquisition unit configured to acquire first position information indicating a watching position of the virtual viewpoint image; a second acquisition unit configured to acquire second position information indicating a position of interest to be included in the virtual viewpoint image and within the image capturing-target area; and a control unit configured to control the virtual viewpoint so that the virtual viewpoint comes close to the position of interest indicated by the acquired second position information from the watching position indicated by the acquired first position information.

19 Claims, 10 Drawing Sheets

(51) Int. Cl.
*G06T 19/00* (2011.01)
*G06F 3/01* (2006.01)
*G06T 7/70* (2017.01)
*H04N 5/232* (2006.01)
*H04N 5/247* (2006.01)

(56) References Cited

U.S. PATENT DOCUMENTS

| | | | | |
|---|---|---|---|---|
| 2015/0145891 | A1* | 5/2015 | Kuffner | G06T 15/20 345/649 |
| 2016/0027209 | A1* | 1/2016 | Demirli | G06T 19/003 345/419 |
| 2017/0171570 | A1* | 6/2017 | Mitsumoto | H04N 5/247 |

FOREIGN PATENT DOCUMENTS

| | | | |
|---|---|---|---|
| CN | 107018355 | A | 8/2017 |
| JP | 2015225529 | A | 12/2015 |
| JP | 2018106496 | A | 7/2018 |
| WO | 2015194501 | A1 | 4/2017 |

OTHER PUBLICATIONS

Office Action issued in Korean Appln No. 10-2019-0102199 dated Feb. 10, 2022. English machine translation provided.

\* cited by examiner

| GAZE POINT ID | POSITION INFORMATION (CENTER COORDINATES) | RADIUS [m] |
|---|---|---|
| 01 | xx.xxxxx/yy.yyyyy | 10 |
| 02 | xx.xxxxx/yy.yyyyy | 10 |
| 03 | xx.xxxxx/yy.yyyyy | 10 |

INFORMATION PROCESSING APPARATUS, INFORMATION PROCESSING METHOD AND STORAGE MEDIUM

BACKGROUND OF THE INVENTION

Field of the Invention

The present invention relates to a technique for generating a virtual viewpoint image.

Description of the Related Art

In recent years, a technique has been attracting attention, which generates a virtual viewpoint image by installing a plurality of cameras at different positions to perform synchronous image capturing and using multi-viewpoint images obtained by the image capturing. Generation and browsing of a virtual viewpoint image based on the multi-viewpoint images are implemented by putting together images captured by a plurality of cameras in an image processing apparatus, such as a server, performing processing, such as rendering, based the virtual viewpoint in the image processing apparatus, and displaying a virtual viewpoint image on a user terminal. In generation of a virtual viewpoint image, a plurality of cameras is caused to face a specific position (hereinafter, sometimes referred to as a gaze point) within an image capturing-target space.

Then, in the service using the virtual viewpoint image such as this, for example, it is possible to watch a specific scene in soccer, basketball, and the like, from a variety of angles, and therefore, it is possible to give a high feeling of being at a live performance to a user compared to conventional captured images. Japanese Patent Laid-Open No. 2015-225529 has disclosed a technique to determine the position and orientation of a virtual viewpoint based on the position and orientation of a user terminal and generate a virtual viewpoint image based on the determined position and orientation of the virtual viewpoint.

However, with the technique described in Japanese Patent Laid-Open No. 2015-225529, in order to appropriately watch a specific scene, it is necessary to change (move) the virtual viewpoint from the user terminal to near the gaze point by a user operation after a distributed virtual viewpoint image is displayed on the user terminal. For example, in a case where the image capturing target is a goal scene of soccer, it is necessary for a user to perform the operation to put the virtual viewpoint closer to the player who has scored a goal. Because of this, in a case where the game is in progress real time and the like, there is a possibility that a user (in particular, a user who is not familiar with the operation of a virtual viewpoint) misses the game itself because the user's attention is distracted by the operation of a virtual viewpoint. This is not limited to the sports game and the same problem may occur in other events, such as a concert.

SUMMARY OF THE INVENTION

The present invention is an information processing apparatus that controls a virtual viewpoint corresponding to a virtual viewpoint image to be generated based on a plurality of images obtained by capturing an image capturing-target area from directions different from one another by a plurality of image capturing apparatuses, the information processing apparatus comprising:

a first acquisition unit configured to acquire first position information indicating a watching position of the virtual viewpoint image;

a second acquisition unit configured to acquire second position information indicating a position of interest to be included in the virtual viewpoint image and within the image capturing-target area; and a control unit configured to control the virtual viewpoint so that the virtual viewpoint comes close to the position of interest indicated by the acquired second position information from the watching position indicated by the acquired first position information.

Further features of the present invention will become apparent from the following description of exemplary embodiments with reference to the attached drawings.

DESCRIPTION OF THE EMBODIMENTS

In the following, embodiments of the present invention are explained with reference to the drawings. The following embodiments are not intended to limit the present invention and all combinations of features explained in the present embodiments are not necessarily indispensable to the solution of the present invention. In addition, a variety of aspects in a range not deviating from the gist of the present invention are also included in the present invention and it is also possible to combine parts of the following embodiments appropriately.

(Image Processing System)

Figure 1:
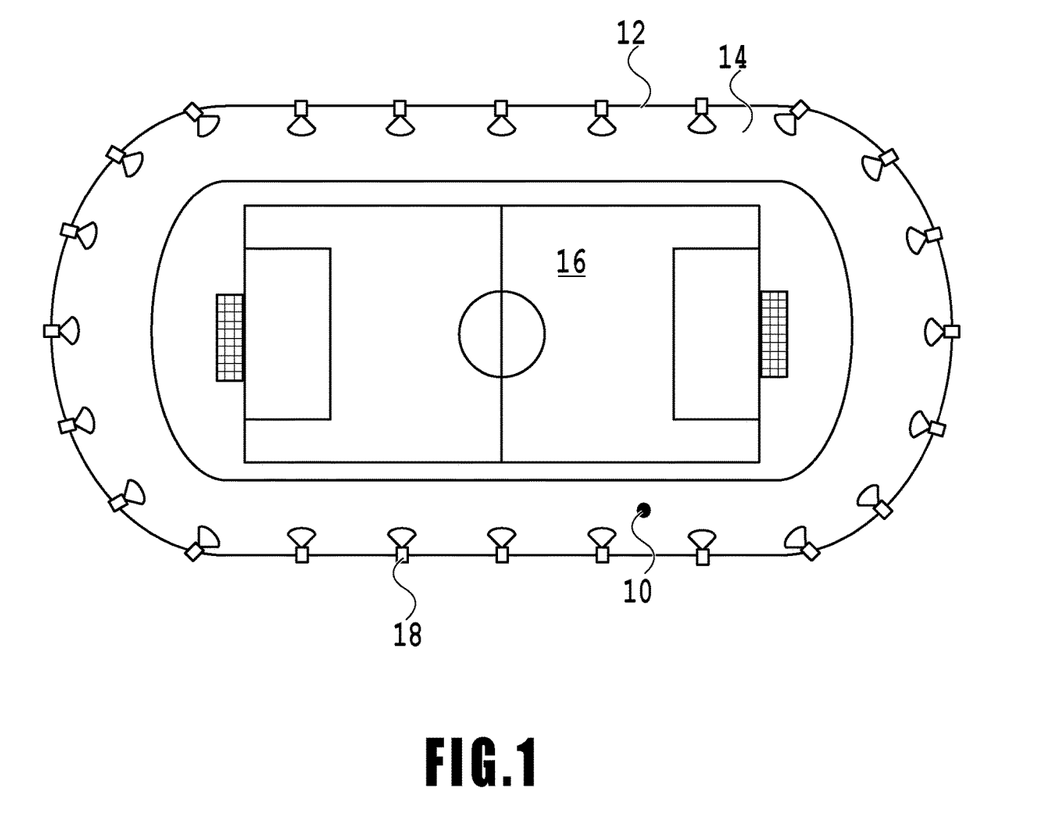
FIG. 1 is an outline diagram of an image processing system.

FIG. 1 is an outline diagram of an image processing system. As shown in FIG. 1, a stadium 12 includes a spectator stand 14 and a field 16 in which a game or the like is actually performed and a plurality of cameras (image capturing apparatuses) 18 is installed. The plurality of the cameras 18 is arranged so that each camera 18 captures at least a part of the field 16, which is an image capturing-target area, and the angle of view of the camera 18 overlaps that of another. For example, the plurality of the cameras 18 is installed so as to surround the spectator stand 14 and the field 16.

Further, a user 10 watches a game (here, as one example thereof, soccer) from the spectator stand 14. The user 10 has a user terminal and enjoys watching the game live and at the same time, plays back and watches a virtual viewpoint image of an event scene, such as a shot scene, a goal scene, and a scene of committing a foul, by operating the user terminal as needed. In the present embodiment, in accordance with the operation of the user terminal (specifically, instructions to play back on the user terminal), a virtual viewpoint image of an appropriate event scene is provided to the user terminal.

Figure 2:
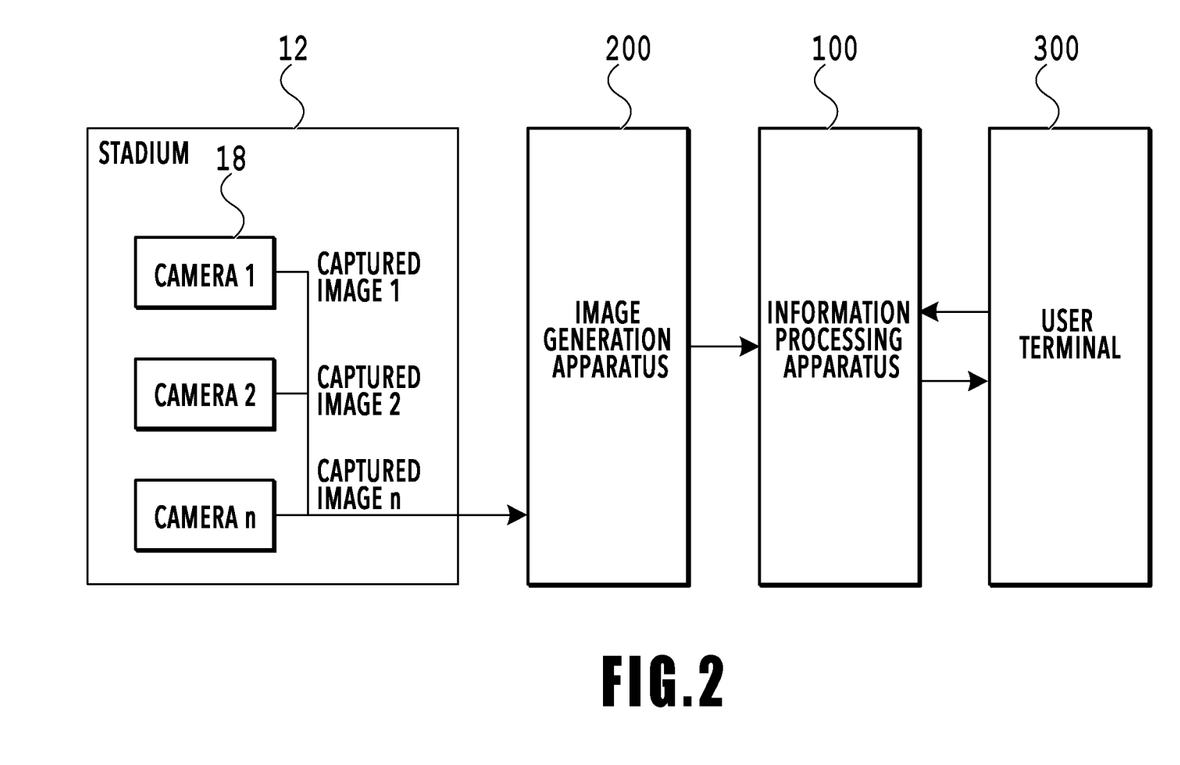
FIG. 2 is an outline configuration diagram of the image processing system.

FIG. 2 is an outline configuration diagram of the image processing system. As shown in FIG. 2, the image processing system includes the plurality of the cameras 18 installed in the stadium 12, an image generation apparatus 200, an information processing apparatus 100, and a user terminal 300

The plurality of the cameras 18 is arranged so that the range of the whole or a part of the stadium 12 is captured by the plurality of the cameras 18 and is connected to one another via a transmission cable. Further, the cameras 18 are arranged so as to face one or a plurality of real camera gaze points set in advance. That is, the one or each of the plurality of real camera gaze points is captured from different directions by the two or more cameras 18. Further, each of the cameras 18 is connected also to the image generation apparatus 200 and transmits an image acquired by capturing the stadium 12 to the image generation apparatus 200.

Each of the plurality of the cameras 18 may be a camera that captures a still image, a camera that captures a moving image, or a camera that captures both a still image and a moving image. Further, in the present embodiment, it is assumed that the term "image" includes the concept of both a moving image and a still image unless specified particularly.

The image generation apparatus 200 is an apparatus that generates a virtual viewpoint image. The image generation apparatus 200 stores images (hereinafter, sometimes referred to as captured images) captured by the plurality of the cameras 18. The image generation apparatus 200 generates a virtual viewpoint image group by using the captured images. The virtual viewpoint image group is a set of a plurality of virtual viewpoint images based on different virtual viewpoints.

The image generation apparatus 200 transmits the generated virtual viewpoint image group and the gaze point data to the information processing apparatus 100. The gaze point data is information indicating the position(s) of the one or a plurality of gaze points set within the image capturing-target stadium 12, and the like. An object, such as a specific player, a ball, and a goal, may be the gaze point. Further, the corner position of the soccer court, the kick position of the penalty kick, and the like may also be the gaze point. It should be noted that the gaze point represented by the gaze point data is the position of interest to be included in the virtual viewpoint image and has a concept different from that of the real camera gaze point described above. However, the real camera gaze point may be managed as one of the gaze points represented by the gaze point data.

Further, the image generation apparatus 200 is, for example, a server apparatus, or the like and has a function as a database that stores a plurality of captured images and the generated virtual viewpoint image group, in addition to the image processing function for generating the virtual viewpoint image described above. In addition, the plurality of the cameras 18 within the stadium 12 and the image generation apparatus 200 are connected by a cable line, such as a wired or wireless communication network line and an SDI (Serial Digital Interface). The image generation apparatus 200 receives captured images from the plurality of the cameras 18 through this line and stores the captured images in the database. Details of the gaze point data will be described later.

The information processing apparatus 100 selects a virtual viewpoint image to be provided to the user terminal 300 from the virtual viewpoint image group generated in the image generation apparatus 200. In more detail, the information processing apparatus 100 selects a virtual viewpoint image to be provided to the user terminal 300 based on the movement path of the virtual viewpoint relating to the virtual viewpoint image to be output to the user terminal 300 and the line-of-sight direction of the virtual viewpoint moving on the movement path. The movement path is a path in a case where the virtual viewpoint is moved to an arbitrary position.

The information processing apparatus 100 selects one gaze point from one or a plurality of gaze points indicated by the gaze point data acquired from the image generation apparatus 200. Further, the information processing apparatus 100 acquires user terminal information from the user terminal 300. Then, the information processing apparatus 100 determines the movement path of the virtual viewpoint relating to the virtual viewpoint image to be generated and the line-of-sight direction of the virtual viewpoint moving on the movement path based on the selected gaze point and the user terminal information acquired from the user terminal 300. In the user terminal information, for example, terminal operation information indicating the operation contents, position information indicating the terminal position, and the like are included. Further, in the terminal operation information, for example, information indicating operations, such as specification of a virtual viewpoint and playback of a virtual viewpoint image, and the like are included.

The information processing apparatus 100 selects a virtual viewpoint image from the virtual viewpoint image group generated by the image generation apparatus 200 based on the movement path of the virtual viewpoint relating to the determined virtual viewpoint image and the line-of-sight direction of the virtual viewpoint moving on the movement path, and outputs the virtual viewpoint image to the user terminal 300.

It may also be possible to transmit information indicating the gaze point determined by the information processing apparatus 100 and the specification of the virtual viewpoint (for example, information relating to the position of the virtual viewpoint, the line-of-sight direction of the virtual viewpoint, and the like) to the image generation apparatus 200, not limited to the above. In this case, the image generation apparatus 200 selects a captured image by the camera group corresponding to the gaze point determined by the information processing apparatus 100 from the captured images by the plurality of the cameras 18 installed in the stadium 12. After this, by processing the selected captured image based on the information indicating the specification of the virtual viewpoint, the image generation apparatus 200 generates a virtual viewpoint image in accordance with the virtual viewpoint and outputs the virtual viewpoint image to the information processing apparatus 100.

Further, the virtual viewpoint image may be provided as follows. That is, the image generation apparatus 200 acquires the information relating to the position of the user terminal from the user terminal and the information relating to the gaze point and determines the movement path of the virtual viewpoint based on the acquired information. Then, the image generation apparatus 200 generates a virtual viewpoint image in accordance with the determined movement path based on the plurality of captured images acquired from the plurality of the cameras 18. In this example, the generation of the virtual viewpoint image group is not indispensable. In the present embodiment, the example of a case where the information processing apparatus 100 and the image generation apparatus 200 are separate apparatuses is explained mainly, but these apparatuses may be integrated into one unit. Further, in the present embodiment, the example in which the image generation apparatus 200 acquires captured images from the plurality of the cameras 18 is explained mainly, but this is not limited, and it may also be possible for the plurality of the cameras 18 to perform part of the processing to generate a virtual viewpoint image for the captured images. In this case, the image data acquired by the image generation apparatus 200 is not the captured image itself but may be already-processed image data. In this case, the generation load of the virtual viewpoint image by the image generation apparatus 200 may be reduced.

As a supplement, the information processing apparatus 100 is, for example, a personal computer or the like. The information processing apparatus 100 may be incorporated in the image generation apparatus 200 or may be incorporated in the user terminal 300, or vice versa. Consequently, for example, the image generation apparatus 200 may be incorporated in the information processing apparatus 100 (that is, the information processing apparatus 100 may have the function of the image generation apparatus 200). As described above, the information processing apparatus 100 and the image generation apparatus 200 may be one integrated apparatus or the information processing apparatus 100 and the user terminal 300 may be one integrated apparatus.

The user terminal 300 receives instructions, for example, such as to move the position of the virtual viewpoint, change the line-of-sight direction of the virtual viewpoint, and switch the viewpoint, based on the input of the user 10. Upon receipt of the instructions from the user 10, the user terminal 300 generates a transmission signal including virtual viewpoint information indicating the contents of the received instructions and transmits the transmission signal to the information processing apparatus 100. Further, the user terminal 300 requests the information processing apparatus 100 to perform automatic setting of the virtual viewpoint based on the position information.

It may also be possible to associate an ID unique to the user 10 with the user terminal 300. Further, the user terminal 300 may be, for example, a personal computer or a mobile terminal, such as a smartphone and a tablet. In addition, the user terminal 300 has at least one of a mouse, a keyboard, a 6-axis controller, and a touch panel. Further, the user terminal 300 has a function to acquire position information by GPS (Global Positioning System) or the like.

It is possible for the image generation apparatus 200, the information processing apparatus 100, and the user terminal 300 to perform transmission and reception of information with one another via a network, such as the internet. The communication between the apparatuses may be wireless communication or wired communication.

(Hardware Configuration of Image Generation Apparatus)

Figure 3:
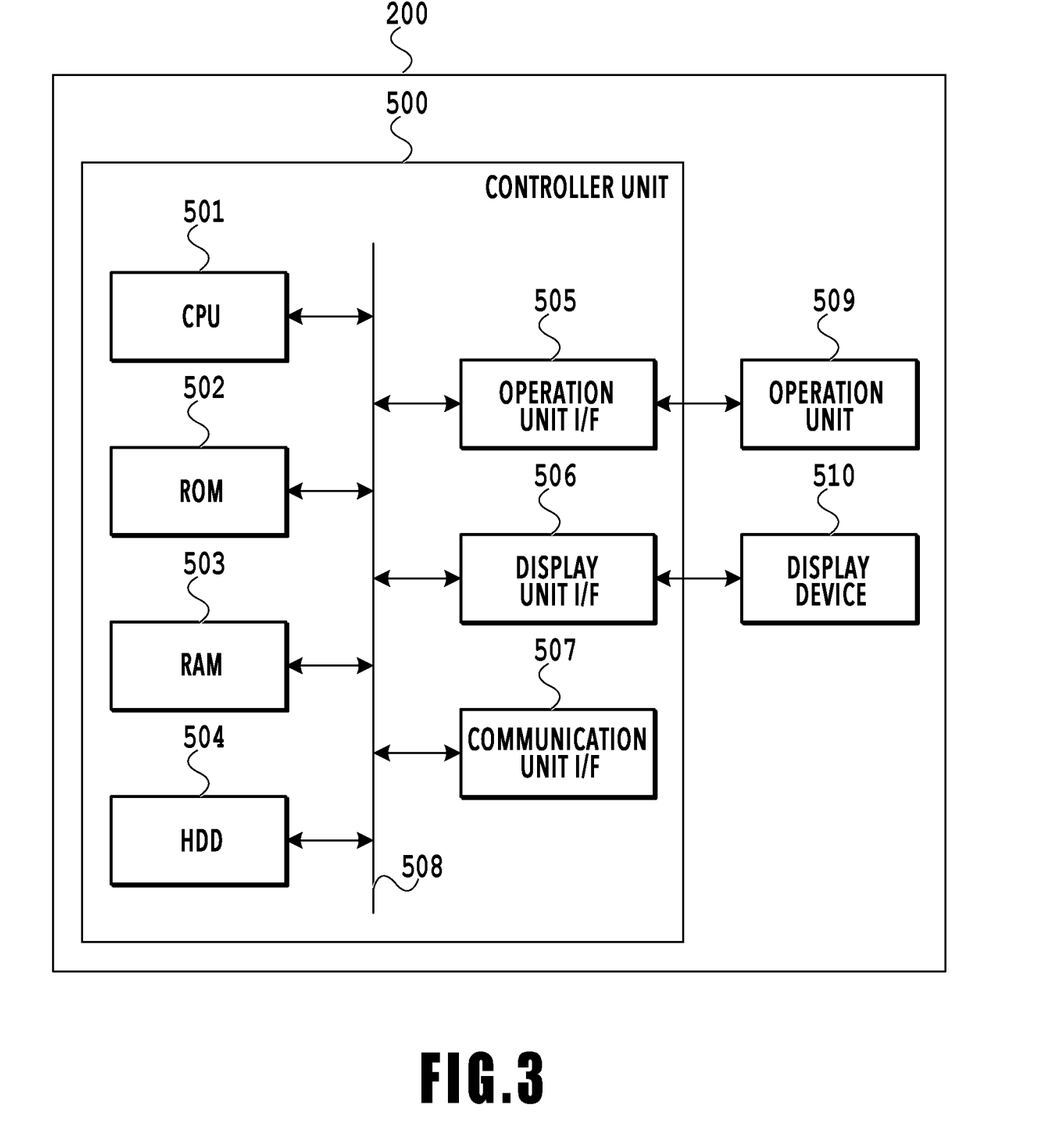
FIG. 3 is a hardware configuration diagram of an image generation apparatus.

FIG. 3 is a diagram showing the hardware configuration of the image generation apparatus 200. The information processing apparatus 100 and the user terminal 300 also have a hardware configuration similar to the hardware configuration shown in FIG. 3. As shown in FIG. 3, the image generation apparatus 200 has a controller unit 500, an operation unit 509, and a display device 510.

The controller unit 500 has a CPU 501, a ROM 502, a RAM 503, an HDD 504, an operation unit I/F (interface) 505, a display unit I/F 506, and a communication unit I/F 507. Further, these units are connected to one another via a system bus 508.

The CPU (Central Processing Unit) 501 boots an OS (Operating System) by a boot program stored in the ROM (Read Only Memory) 502. The CPU 501 executes an application program stored in the HDD (Hard Disk Drive) 504 on the booted OS. The CPU 501 implements various kinds of processing by executing application programs. The HDD 504 stores application programs and the like as described above. As a work area of the CPU 501, the RAM (Random Access Memory) 503 is used. Further, the CPU 501 may include one processor or may include a plurality of processors.

The operation unit I/F 505 is an interface with the operation unit 509. The operation unit I/F 505 sends out information input by a user at the operation unit 509 to the CPU 501. The operation unit 509 has, for example, a mouse, a keyboard, and the like. The display unit I/F 506 outputs image data to be displayed on the display device 510 to the display device 510. The display device 510 has a display, such as a liquid crystal display.

The communication unit I/F 507 is, for example, an interface for performing communication, such as Ethernet (registered trademark). The communication unit I/F 507 is connected to a transmission cable and inputs and outputs information from and to an external device via the transmission cable. The communication unit I/F 507 may be a circuit or an antenna for performing wireless communication. Further, it is also possible for the controller unit 500 to perform display control to cause an external display device (not shown schematically) connected via a cable or a network to display an image. In this case, the controller unit 500 implements display control by outputting display data to an external display device.

As above, the hardware configuration of the image generation apparatus 200 is explained by using FIG. 3, but each configuration shown in FIG. 3 is not necessarily an indispensable configuration. For example, in the image generation apparatus 200, the display device 510 is not an indispensable configuration. Further, in the above-described explanation, explanation is given on the assumption that the controller unit 500 has the CPU 501, but the explanation is not necessarily limited to this. For example, the controller unit 500 may have hardware, such as ASIC and FPGA, in place of the CPU 501 or in addition to the CPU 501. In this case, it may also be possible for the hardware, such as ASIC and FPGA, to perform part or all of the processing to be performed by the CPU 501. ASIC is an abbreviation of Application Specific Integrated Circuit and FPGA is an abbreviation of Field Programmable Gate Array.

(Function Configuration of Information Processing Apparatus)

Figure 4:
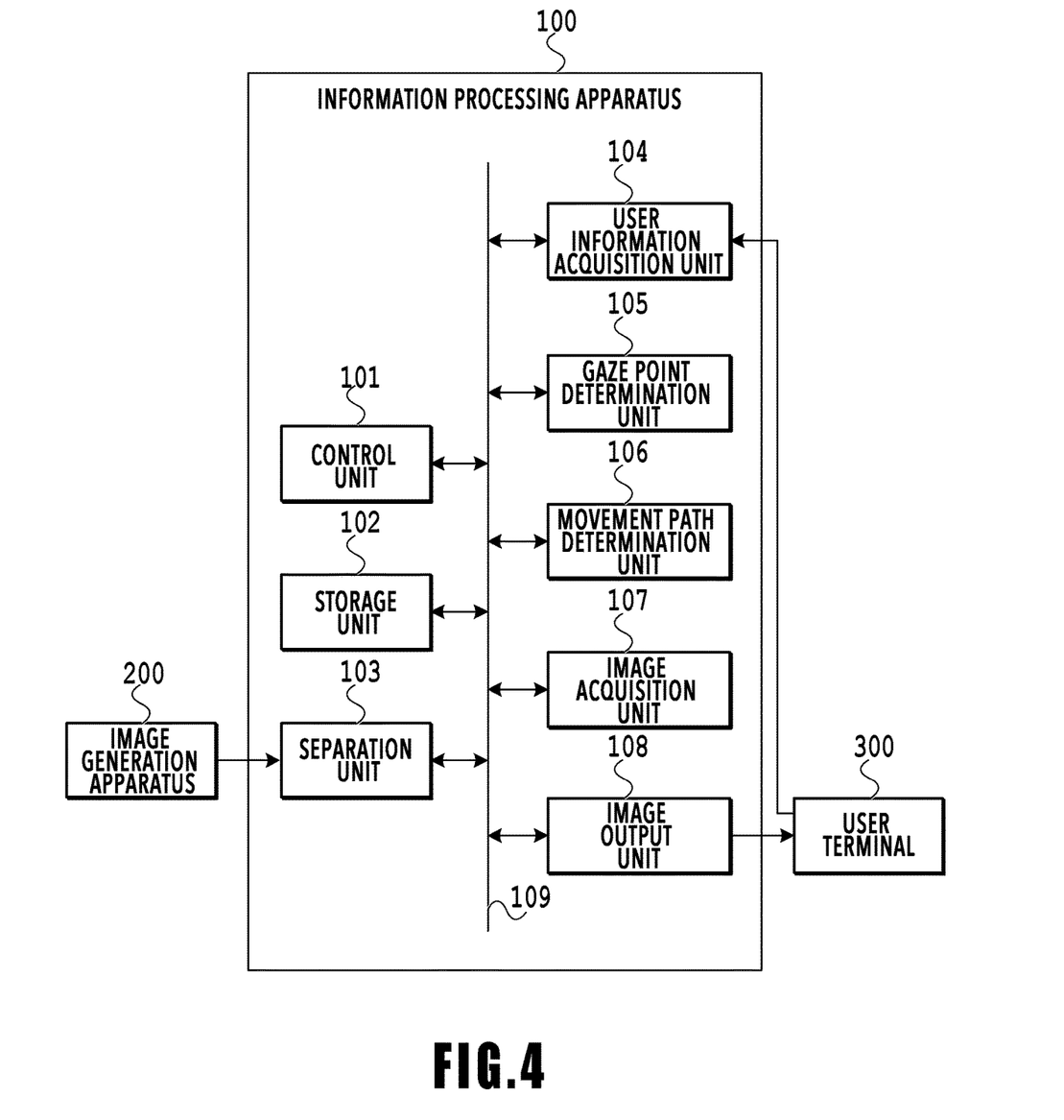
FIG. 4 is a function configuration diagram of an information processing apparatus.

FIG. 4 is a block diagram showing the function configuration of the information processing apparatus 100. Each function shown in FIG. 4 is implemented by, for example, the CPU 501 in FIG. 3 reading the various programs stored in the ROM 502 and performing control of each unit. Further, it may also be possible to implement a part or all of the configurations shown in FIG. 4 by, for example, dedicated hardware, such as ASIC and FPGA.

As shown in FIG. 4, the information processing apparatus 100 has a control unit 101, a storage unit 102, a separation unit 103, a user information acquisition unit 104, a gaze point determination unit 105, a movement path determination unit 106, an image acquisition unit 107, and an image output unit 108. Further, these units are connected to one another by an internal bus 109 and capable of performing transmission and reception of data with one another under control by the control unit 101.

The control unit 101 controls the operation of the entire information processing apparatus 100 in accordance with computer programs stored in the storage unit 102. The storage unit 102 includes a nonvolatile memory and stores various kinds of data and programs (for example, computer programs controlling the operation of the entire information processing apparatus 100, and the like).

The separation unit 103 separates the virtual viewpoint image group and the gaze point data acquired from the image generation apparatus 200 and outputs them. The user information acquisition unit 104 acquires user terminal information including position information relating to the user 10 from the user terminal 300. The position information relating to the user 10 is, for example, information indicating the watching position of a virtual viewpoint image. The watching position of a virtual viewpoint image is the position of the terminal used for watching of a virtual viewpoint image or the position of a user who watches a virtual viewpoint image. The user information acquisition unit 104 may acquire the position information acquired by the user terminal 300 by GPS from the user terminal 300 as the position information relating to the user 10. Further, it may also be possible for the user information acquisition unit 104 to acquire information indicating the position, such as the seat number of the spectator stand 14 of the stadium 12, from the user terminal 300 and specify the position of the user 10 based on the acquired information. Furthermore, the position information indicating the position of the user 10 may be acquired from the captured image acquired by a monitoring camera or the like installed within the stadium 12 based on the processing to detect the user 10.

The gaze point determination unit 105 determines one gaze point from the gaze point data acquired from the image generation apparatus 200. The gaze point determination unit 105 selects, for example, a player who has scored a goal, a player who has committed a foul, or the like and determines as a gaze point. Further, it may also be possible for the gaze point determination unit 105 to determine a gaze point based on operation information that is input from the user terminal 300 (for example, information specifying a position within the field by a user, information in accordance with the operation to select a gaze point from a plurality of candidate positions by a user, information in accordance with the operation to specify a virtual viewpoint by a user, or the like). Furthermore, a gaze point may be selected from a plurality of candidate positions based on information relating to a user (for example, whether a user desires to watch the entire game or watch only one of the teams by focusing attention thereon, which team a user is a fan of, or the like). Still furthermore, a gaze point may be determined based on the past watching history or operation history of the user in the user terminal.

The movement path determination unit 106 determines the movement path of the virtual viewpoint relating to the virtual viewpoint image to be output to the user terminal 300, and the line-of-sight direction of the virtual point moving on the movement path. In the following, explanation is given on the assumption that the movement path determination unit 106 determines the position on the three-dimensional coordinates as the position of each virtual viewpoint moving on the movement path in the present embodiment. However, in another embodiment, it may also be possible to assume that the movement path determination unit 106 determines the position on the two-dimensional coordinates as the position of each virtual viewpoint moving on the movement path. Further, in this case, it may also be possible for the movement path determination unit 106 to determine the height of the position of the virtual viewpoint relating to the virtual viewpoint image as an arbitrary value or a fixed value without using the position information acquired by the user information acquisition unit 104.

In a case where the user terminal information is acquired from the user terminal 300 by the user information acquisition unit 104, the movement path determination unit 106 determines the movement path of the virtual viewpoint based on the gaze point determined by the gaze point determination unit 105 and the position information included in the user terminal information. Further, the movement path determination unit 106 determines the line-of-sight direction of each virtual viewpoint moving on the movement path so as to face the gaze point determined by the gaze point determination unit 105.

The image acquisition unit 107 acquires the movement path of the virtual viewpoint determined by the movement path determination unit 106 and the virtual viewpoint image corresponding to the line-of-sight direction of each virtual viewpoint moving on the movement path. It may also be possible for the image acquisition unit 107 to have a function to generate a virtual viewpoint image by rendering based on the information received from the image generation apparatus 200. The image output unit 108 outputs the virtual viewpoint image acquired by the image acquisition unit 107 to the user terminal 300.

(Function Configuration of Image Generation Apparatus)

Figure 5:
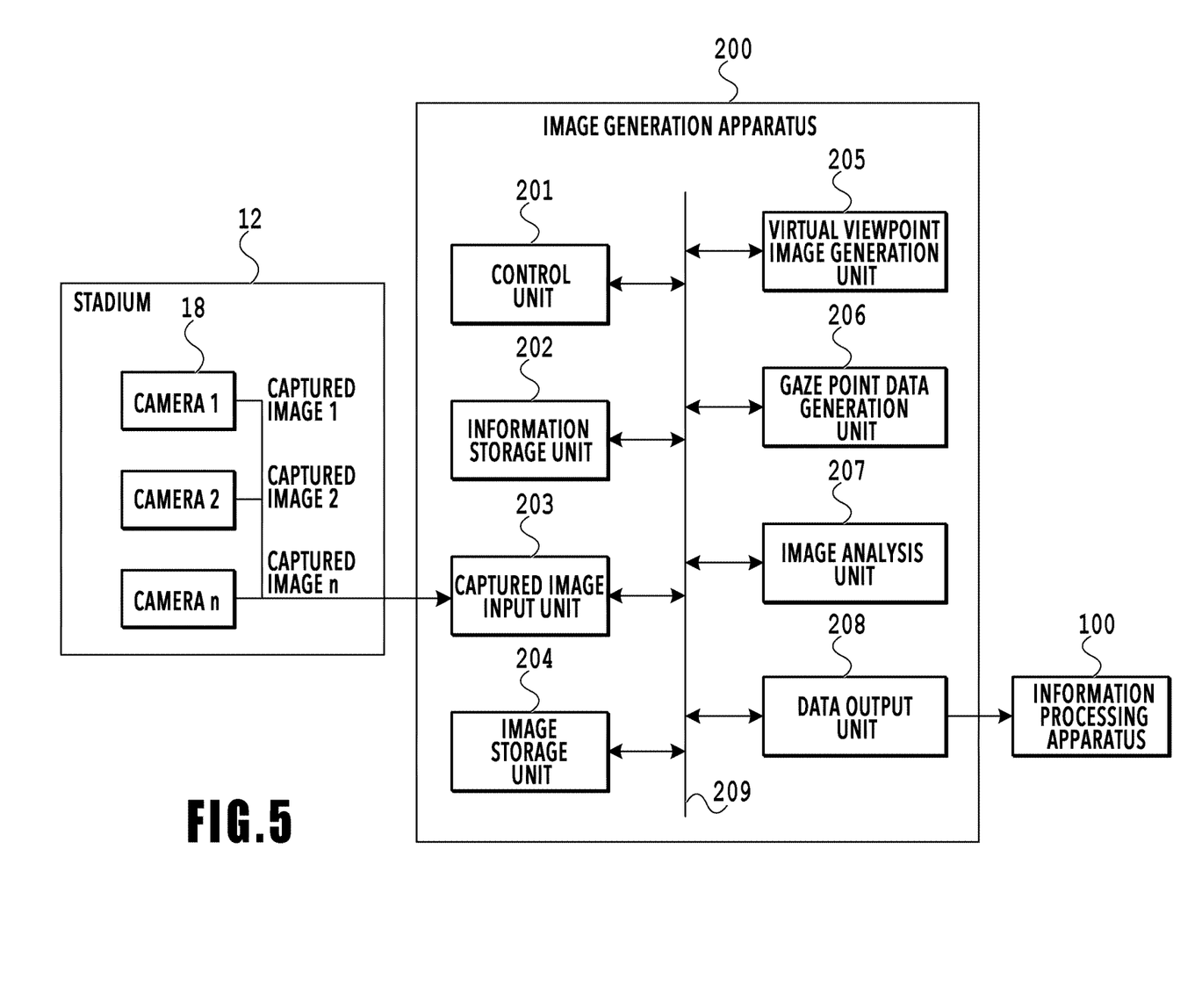
FIG. 5 is a function configuration diagram of the image generation apparatus.

FIG. 5 is a block diagram showing the function configuration of the image generation apparatus 200. As shown in FIG. 5, the image generation apparatus 200 has a control unit 201, an information storage unit 202, a captured image input unit 203, an image storage unit 204, a virtual viewpoint image generation unit 205, a gaze point data generation unit 206, an image analysis unit 207, and a data output unit 208. Further, these units are connected to one another by an internal bus 209 and capable of performing transmission and reception of data with one another under control by the control unit 201.

The control unit 201 controls the operation of the entire image generation apparatus 200 in accordance with computer programs stored in the information storage unit 202. The information storage unit 202 includes a nonvolatile memory and stores information, such as programs (for example, computer programs controlling the operation of the entire image generation apparatus 200, and the like) and various kinds of data.

The captured image input unit 203 acquires images captured by the plurality of the cameras 18 installed in the stadium 12 at a predetermined frame rate and outputs the images to the image storage unit 204. The captured image input unit 203 acquires captured images by a wired or wireless communication module or an image transmission module, such as SDI.

The image storage unit 204 is a large-capacity storage device, for example, such as a magnetic disc, an optical disc, and a semiconductor memory, and stores captured images acquired by the captured image input unit 203 and a virtual viewpoint image group generated based on the captured images. It may also be possible to provide the image storage unit 204 physically outside the image generation apparatus 200. Further, the captured images and the virtual viewpoint image group generated based on the captured images, which are stored in the image storage unit 204, are stored in an image format, for example, the MXF (Material eXchange Format) format or the like. In addition, the captured images and the virtual viewpoint image group generated based on the captured images, which are stored in the image storage unit 204, are compressed in, for example, the MPEG 2 format or the like. However, the formats of data are not necessarily limited to those.

The virtual viewpoint image generation unit 205 generates a virtual viewpoint image group from a plurality of captured images stored in the image storage unit 204. As a method of generating a virtual viewpoint image group, mention is made of, for example, a method using image-based rendering, and the like. The image-based rendering is a rendering method of generating a virtual viewpoint image from images captured from a plurality of actual viewpoints without performing a modeling step (that is, a process of creating a shape of an object by using a geometric figure).

The method of generating a virtual viewpoint image group is not limited to the image-based rendering and it may also be possible to use model-based rendering (MBR). Here, the MBR is a rendering method of generating a virtual viewpoint image by using a three-dimensional model generated based on a plurality of captured images acquired by capturing an object from a plurality of directions. Specifically, the MBR is a rendering method of generating an appearance of a target scene from a virtual viewpoint as an image by using a three-dimensional shape (model) of the target scene acquired by a three-dimensional shape restoration method, such as a volume intersection method and MULTI-VIEW-STEREO (MVS).

The virtual viewpoint image generation unit 205 gives each virtual viewpoint image included in the generated virtual viewpoint image group the virtual viewpoint (position of the virtual viewpoint) corresponding to the virtual viewpoint image, the direction of the line of sight, and the data (gaze point data) indicating the gaze point generated by the gaze point data generation unit 206. The virtual viewpoint image generation unit 205 gives the virtual viewpoint image (or the virtual viewpoint image group) metadata including data indicating, for example, the virtual viewpoint, the direction of the line of sight, and the gaze point as gaze point data.

The virtual viewpoint image group to be generated includes virtual viewpoint images of a variety of the virtual viewpoints, the directions of line of sight, and the gaze points and in the present embodiment, it is assumed that the virtual viewpoint image group such as this is compression-coded in the space direction and the time direction as one image stream. However, in another embodiment, the virtual viewpoint image group may include a plurality of images independent of one another in place of one image stream. Alternatively, the virtual viewpoint image group may not be compression-coded.

Further, the image generation apparatus 200 may generate, for example, information indicating a three-dimensional model and information for generating a virtual viewpoint image, such as an image to be mapped to the three-dimensional model, in place of the virtual viewpoint image group. That is, it may also be possible for the virtual viewpoint image generation unit 205 to generate information necessary for performing rendering for a virtual viewpoint image in the information processing apparatus 100 or the user terminal 300, in place of generating the virtual viewpoint image for which rendering is performed.

The gaze point data generation unit 206 generates gaze point data by using position information on one or a plurality of objects acquired by the image analysis unit 207 and/or position information on a predetermined fixed position and outputs the generated gaze point data to the virtual viewpoint image generation unit 205. Here, by using FIG. 6, the gaze point data is explained supplementally.

Figure 6:
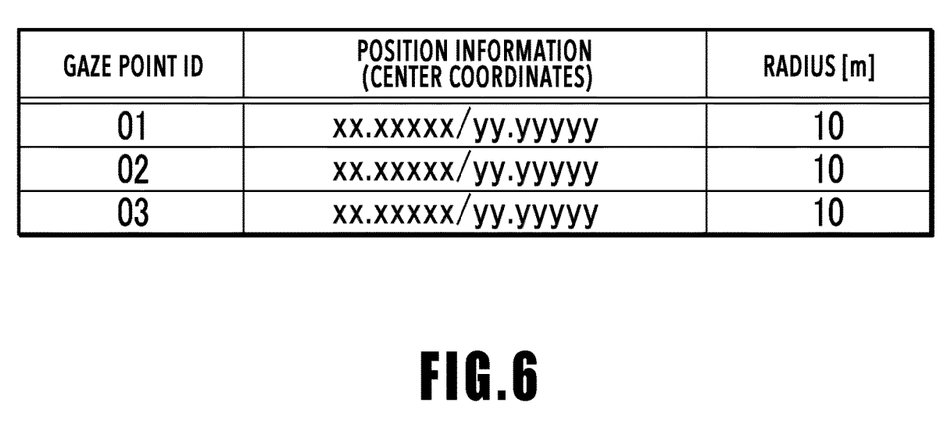
FIG. 6 is a data structure diagram showing a configuration of gaze point data.

FIG. 6 is a data structure diagram showing the configuration of gaze point data. As shown in FIG. 6, the gaze point data includes, for example, the gaze point ID, the position information, and the radius. The gaze point data only needs to be information capable of specifying the position of a gaze point and is not necessarily limited to the configuration (contents) shown in FIG. 6.

The gaze point ID includes, for example, alphabets, figures, and the like and is an identification number assigned to every gaze point. The position information indicates the latitude and longitude of the center coordinates of a gaze point in the degree format. The radius is a distance from the center coordinates of a gaze point and indicates an effective range in a case where a virtual viewpoint image is generated. In the following, a circular area indicating the effective range specified by the center coordinates and the radius is referred to as a gaze point unit.

In the present embodiment, the gaze point is a point that should be captured in a virtual viewpoint image and typically, a point selected by a user. Further, the gaze point may correspond to a specific player and an object, such as a ball and a goal. Furthermore, the gaze point may also correspond to the corner of a soccer court, a penalty mark of a penalty kick, and the like. Still furthermore, in the gaze point data, information on the real camera gaze point described above may be included. The radius information in FIG. 6 is effective information in a case where the gaze point is a real camera gaze point. That is, the radius information is not indispensable.

In addition, in a case where a virtual viewpoint image is generated by using captured images by the plurality of the cameras 18 caused to face a certain real camera gaze point, on a condition that the generation target is a virtual viewpoint image in an area included in the gaze point unit corresponding to the real camera gaze point, it is possible to generate a virtual viewpoint image with a higher image quality. Further, the gaze point data is not limited to the data acquired by the analysis of a captured image by the image analysis unit 207 and may be registered in advance in the image generation apparatus 200 or the information processing apparatus 100.

Returning to FIG. 5, the image analysis unit 207 analyzes a captured image that is input to the captured image input unit 203 and acquires position information on the gaze point. The image analysis unit 207 acquires position information on the position of a specific object or a predetermined fixed position as the position information on the gaze point by using a technique, for example, such as Visual Hull. The specific object is a person, such as a specific player and a referee, or a ball and the like. The gaze point may also be a predetermined fixed position on the field, such as the field center, the position in front of the goal, and the penalty mark. In addition, in a case where the plurality of the cameras 18 is installed so that the optical axes of the cameras 18 are caused to face a common position, the gaze point may be the common position. The data output unit 208 outputs the virtual viewpoint image group generated in the virtual viewpoint image generation unit 205 to the information processing apparatus 100 at a predetermined frame rate.

(Movement Path Determination Processing)

Figure 7:
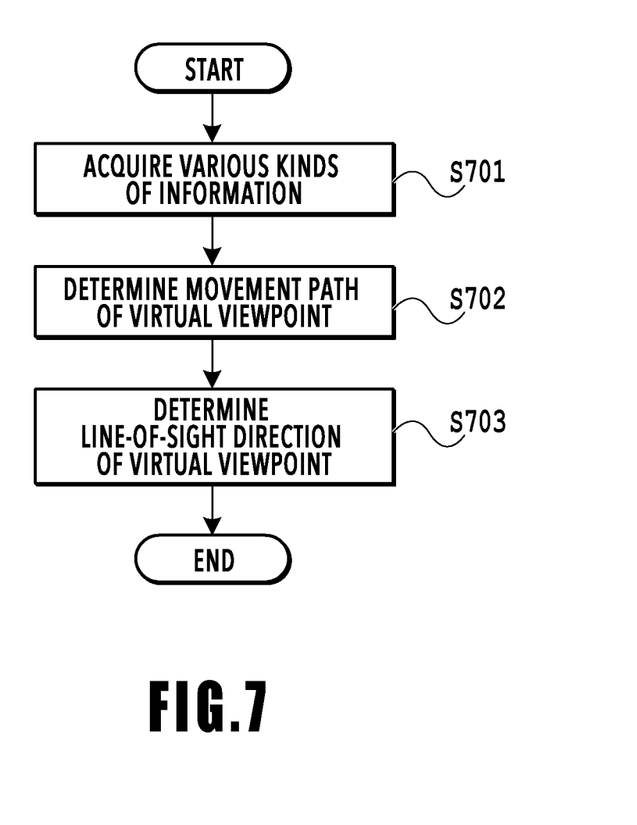
FIG. 7 is a flowchart showing a procedure of processing in a movement path determination unit.

FIG. 7 is a flowchart showing a procedure of the processing in the movement path determination unit 106. In more detail, FIG. 7 is a flowchart showing a procedure of the processing to determine the movement path of a virtual viewpoint relating to a virtual viewpoint image to be output to the user terminal 300, and the line-of-sight direction of a virtual viewpoint moving on the movement path. The processing of this flowchart is performed in a case where the information processing apparatus 100 receives a request to play back a virtual viewpoint image from the user terminal 300. In the following, it is assumed that symbol "S" in explanation of the flowchart represents a step.

At S701, the movement path determination unit 106 acquires the gaze point determined by the gaze point determination unit 105. Further, the movement path determination unit 106 acquires user terminal information via the user information acquisition unit 104.

At S702, the movement path determination unit 106 determines the movement path of a virtual viewpoint relating to a virtual viewpoint image to be output to the user terminal 300 based on the gaze point determined by the gaze point determination unit 105 and the position information on the user terminal 300, which is included in the user terminal information. Here, by using FIG. 8, the movement path of a virtual viewpoint is explained supplementally.

Figure 8:
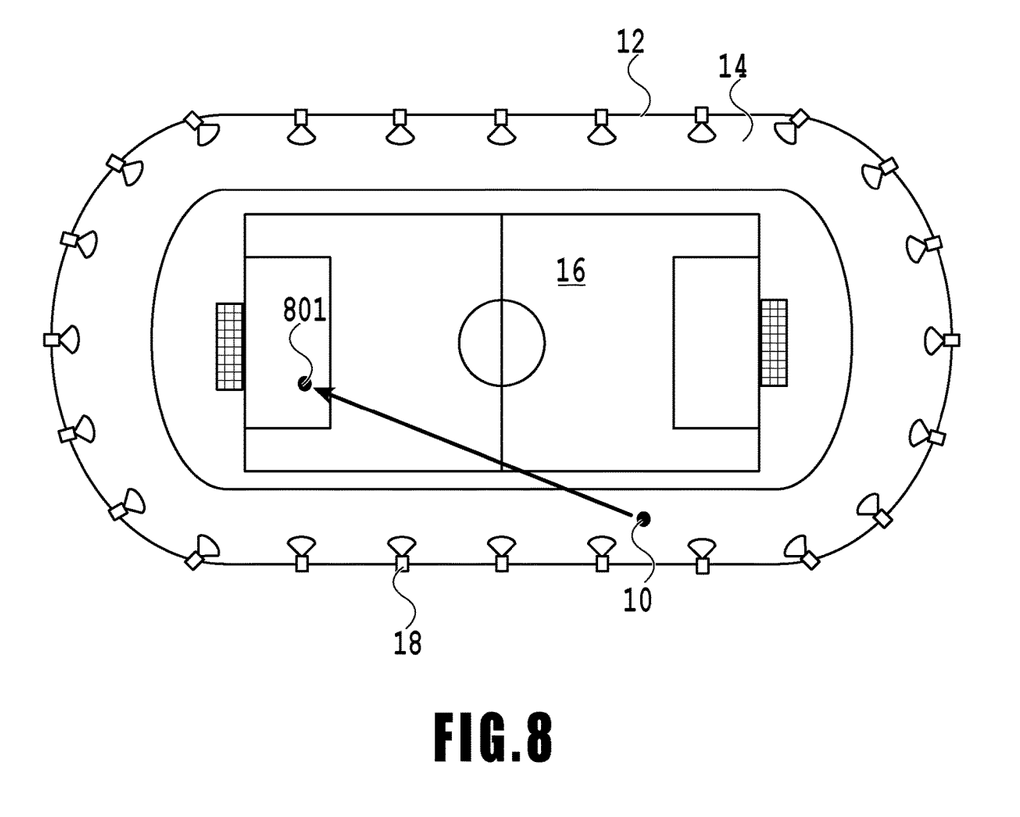
FIG. 8 is a schematic diagram showing a movement path of a virtual viewpoint determined by the movement path determination unit.

FIG. 8 is a schematic diagram showing a movement path of a virtual viewpoint determined by the movement path determination unit 106. In FIG. 8, symbol 801 is a gaze point and is, for example, a player who has scored a goal. Further, in FIG. 8, the movement path determination unit 106 determines the line that starts from the position of the user 10 and extends linearly toward the position of the gaze point 801 as a movement path. The virtual viewpoint is controlled so as to come close to the gaze point 801 from the position of the user 10 along this movement path. At this time, the line-of-sight direction of the virtual viewpoint is caused to face the gaze point 801. The position of the user 10 and the position of the gaze point are represented by three-dimensional coordinates, and therefore, the movement path determination unit 106 determines the movement path including not only the path in the horizontal and vertical directions but also the path in the height direction, not shown schematically.

Figure 9:
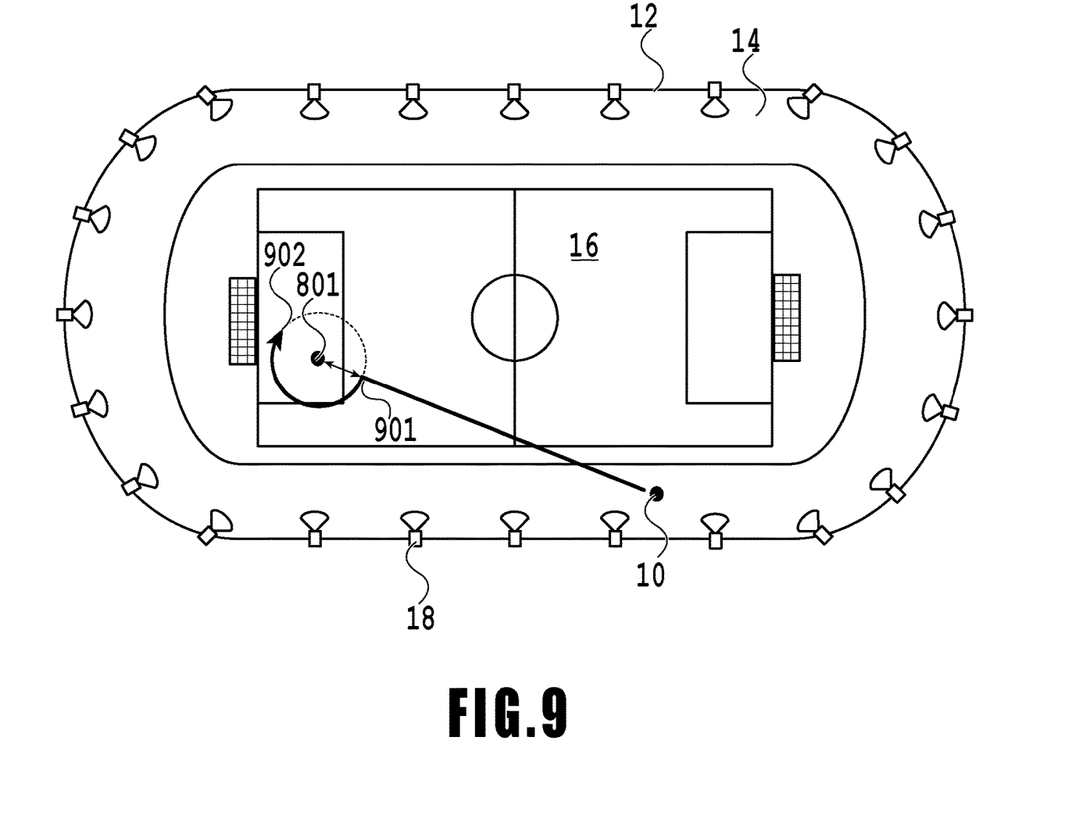
FIG. 9 is a schematic diagram showing a movement path of a virtual viewpoint determined by the movement path determination unit.

Further, the control of a virtual viewpoint is not limited to the control to move the virtual viewpoint from the position of the user 10 toward the gaze point 801. Another example is explained supplementally by using FIG. 9. FIG. 9 is a schematic diagram showing the movement path of the virtual viewpoint determined by the movement path determination unit 106. In FIG. 9, symbol 901 is the start point in a case where the virtual viewpoint is turned around the gaze point 801 as a center and the start point is located a predetermined distance apart from the gaze point 801. Further, symbol 902 is the end point in a case where the virtual point is turned 180 degrees from the start point 901. In a case where the virtual viewpoint reaches the start point 901, the movement path determination unit 106 switches the movement path extending from the user 10 toward the gaze point 801 linearly to the movement path that turns the virtual viewpoint around the gaze point 801 as a center and determines the movement path so as to turn up to the end point 902 of the turn.

In FIG. 9, explanation is given by using the linear movement path extending from the user 10 toward the gaze point 801 as the movement path of the virtual viewpoint, but the movement path of the virtual viewpoint is not necessarily limited to this and for example, may be a line other than the straight line, such as a wavy line. Further, it may also be possible to change the radius of the circle in a case where the virtual viewpoint is turned in accordance with the situation around the gaze point 801. For example, it may also be possible to change the radius of the circle depending on the density of players existing around the gaze point 801. In this case, specifically, in a case where the density of players existing around the gaze point 801 is high, the radius of the circle is reduced so as to put the movement path close to the gaze point 801.

In addition, the shape in a case where the virtual viewpoint is turned is not necessarily limited to a circle and another shape, such as an ellipse and a polygon, may be accepted. Further, the direction in which the virtual viewpoint is turned is not necessarily limited to the horizontal direction and it may also be possible to enable the virtual viewpoint to be turned in all the directions along the radii of the sphere with the gaze point 801 as a center. For example, in a case where a player selected as the gaze point 801 has scored a goal by an overhead kick, it may also be possible to turn the virtual viewpoint over the head of the player or to turn the virtual viewpoint on the front side of the player. In addition, the rotation angle in a case where the virtual viewpoint is turned is not limited to 180 degrees and it is possible to turn the virtual viewpoint by any angles. Further, the movement of the virtual viewpoint is not limited to the linear movement and the turn movement. For example, in a case where the gaze point 801 moves, it may also be possible to control the virtual viewpoint so as to enter the movement direction of the gaze point 801. Further, it may also be possible to control the virtual viewpoint so as to move three-dimensionally.

Returning to FIG. 7, the movement path determination unit 106 determines the line-of-sight direction of the virtual viewpoint moving on the movement path determined at S702. Here, by using FIG. 10, the line-of-sight direction of the virtual viewpoint is explained supplementally.

Figure 10:
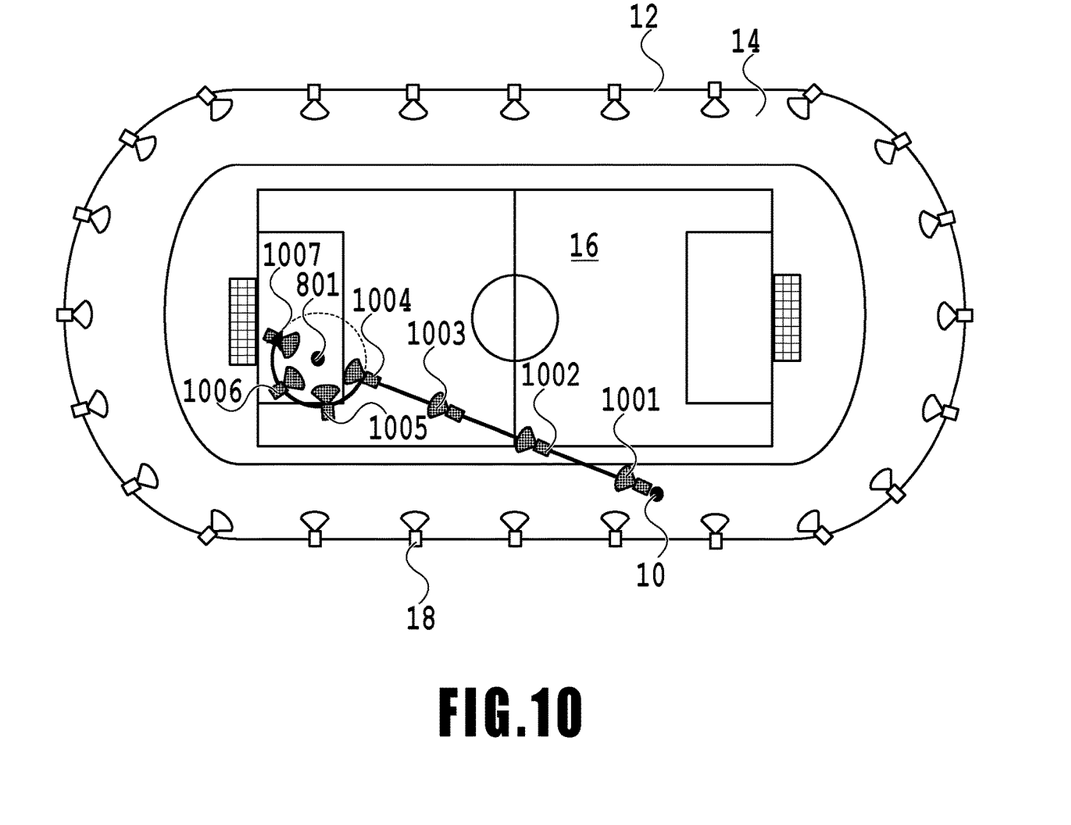
FIG. 10 is a schematic diagram showing a movement path of a virtual viewpoint determined by the movement path determination unit.

FIG. 10 is a schematic diagram showing the line-of-sight direction of a virtual viewpoint, which is determined by the movement path determination unit 106. In FIG. 10, symbol 1001 to symbol 1007 are virtual viewpoints and the virtual viewpoint moves on the movement path from the start point toward the end point of the movement path. The movement path determination unit 106 determines the line-of-sight direction of each virtual viewpoint so that the line-of-sight direction of the virtual viewpoint moving on the movement path faces the gaze point 801. That is, the line-of-sight directions of all the virtual viewpoints of symbol 1001 to symbol 1007 are caused to face the gaze point 801.

As explained above, according to the present embodiment, it is possible to determine the movement path of a virtual viewpoint based on the position of a user and the position of a gaze point, and the line-of-sight direction of each virtual viewpoint moving on the movement path and generate a virtual viewpoint image based on the movement path and the line-of-sight direction. Because of this, it is possible for a user to watch a virtual viewpoint image in a case where the virtual viewpoint is moved from the user terminal to the gaze point only by performing the start operation for watching the virtual viewpoint image. Further, also in a case where a user specifies the gaze point, which is the destination of movement of the virtual viewpoint, it is no longer necessary for the user to input the movement start position of the virtual viewpoint, and therefore, it is possible to reduce time and effort of the user. Furthermore, it is possible for a user to switch the movement path of the virtual viewpoint to the movement path that turns the viewpoint around the gaze point as a center, and therefore, it is possible for the user to watch a more appropriate virtual viewpoint image.

Other Embodiments

In the above-described embodiment, explanation is given on the assumption that the processing of the flowchart shown in FIG. 7 is performed (started) in a case where a request to play back a virtual viewpoint image is received from the user terminal 300, but the execution of the processing of the flowchart shown in FIG. 7 is not necessarily limited to this. Consequently, for example, it may also be possible for the movement path generation unit 106 to perform the processing of the flowchart shown in FIG. 7 each time an event trigger signal in a case where an event occurs, such as a shot and a foul, is received via a reception unit (not shown schematically) of the information processing apparatus 100.

In this case, the information processing apparatus 100 generates a virtual viewpoint image each time based on the movement path of the determined virtual viewpoint and the line-of-sight direction of the virtual viewpoint moving on the movement path, and transmits the virtual viewpoint image to the user terminal 300. Upon receipt of the virtual viewpoint image, the user terminal 300 switches the display to playback of the virtual viewpoint image. Alternatively, the user terminal 300 may display a notification that prompts playback of the virtual viewpoint image on a screen. By doing so, it is possible for a user to watch the virtual viewpoint image relating to the event that has occurred immediately before without missing it. Further, in the above-described embodiment, the case is illustrated where the game of soccer is captured, but the image capturing target is not necessarily limited to this. For example, it is possible to apply the present embodiment to image capturing of the games of other sports, such as rugby, tennis, ice skating, and basketball, and a performance, such as a live performance and a concert.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the above-described embodiment, the operation relating to the change of a virtual viewpoint is made easy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-167879, filed Sep. 7, 2018, which is hereby incorporated by reference wherein in its entirety.

What is claimed is:

1. An information processing apparatus comprising:
one or more memories configured to store instructions; and
one or more processors communicatively connected to the one or more memories and configured to execute the stored instructions to:
acquire a first virtual viewpoint position information for specifying a first view direction to a position of interest from a watching position, by a user, of a virtual viewpoint image to be generated based on a plurality of images obtained by capturing an image capturing target area from directions different from one another by a plurality of image capturing apparatuses;
acquire a second virtual viewpoint position information for specifying a second view direction to the position of interest to be included in the virtual viewpoint image and within the image capturing-target area;
determine a movement path that starts at a first virtual viewpoint position corresponding to the first virtual viewpoint information, towards a second virtual viewpoint position corresponding to the second virtual viewpoint information, and includes one or more intermediate virtual viewpoints each specifying a view direction to the position of interest; and
control a virtual viewpoint to move from the first virtual viewpoint position and the first view direction to the second virtual viewpoint position and the second view direction along the determined movement path.

2. The information processing apparatus according to claim 1, wherein the watching position is a position of a terminal used for watching of the virtual viewpoint image.

3. The information processing apparatus according to claim 1, wherein the watching position is a position of a user who watches the virtual viewpoint image.

4. The information processing apparatus according to claim 3, wherein the first virtual viewpoint position information is acquired based on processing to detect the user from a captured image.

5. The information processing apparatus according to claim 3, wherein the first virtual viewpoint position information is acquired based on at least one of GPS data and a seat number of a spectator stand.

6. The information processing apparatus according to claim 1, wherein the position of interest is a position of a specific object within the image capturing target area.

7. The information processing apparatus according to claim 1, wherein the position of interest is a position specified by a user.

8. The information processing apparatus according to claim 1, wherein the position of interest is a position selected from a plurality of candidate positions.

9. The information processing apparatus according to claim 1, wherein the movement path includes at least one of a linear portion where the virtual viewpoint is controlled so as to move linearly from the first virtual viewpoint position to an intermediate virtual viewpoint position which is towards the position of interest and a specific distance apart from the position of interest, or a rotational portion where the virtual viewpoint is controlled so as to move rotationally around the position of interest from the intermediate virtual viewpoint position to the second virtual viewpoint position.

10. The information processing apparatus according to claim 1, wherein the virtual viewpoint is controlled so as to move with a line-of-sight direction facing toward the position of interest.

11. The information processing apparatus according to claim 1, wherein the virtual viewpoint is controlled so as to move around with respect to a movement direction of the position of interest in a case where the position of interest moves.

12. The information processing apparatus according to claim 1, wherein the virtual viewpoint is controlled so as to move three-dimensionally.

13. The information processing apparatus according to claim 1, wherein the one or more processors further execute the instructions to:
generate the virtual viewpoint image corresponding to the controlled virtual viewpoint based on the plurality of images.

14. The information processing apparatus according to claim 1, wherein
the movement path of the virtual viewpoint comes close to the position of interest from the watching position.

15. An information processing method comprising:
acquiring a first virtual viewpoint position information for specifying a first view direction to a position of interest from a watching position, by a user, of a virtual viewpoint image to be generated based on a plurality of images obtained by capturing an image capturing target area from directions different from one another by a plurality of image capturing apparatuses;
acquiring a second virtual viewpoint position information for specifying a second view direction to the position of interest to be included in the virtual viewpoint image and within the image capturing target area;
determining a movement path that starts at a first virtual viewpoint position corresponding to the first virtual viewpoint information, towards a second virtual viewpoint position corresponding to the second virtual viewpoint information, and includes one or more intermediate virtual viewpoints each specifying a view direction to the position of interest; and
controlling a virtual viewpoint to move from the first virtual viewpoint position and the first view direction to the second virtual viewpoint position and the second view direction along the determined movement path.

16. The information processing method according to claim 15, wherein the watching position is a position of a terminal used for watching of the virtual viewpoint image.

17. The information processing method according to claim 15, wherein the watching position is a position of a user who watches the virtual viewpoint image.

18. A non-transitory computer readable storage medium storing a program for causing a computer to perform an information processing method, the information processing method comprising:
acquiring a first virtual viewpoint position information for specifying a first view direction to a position of interest from a watching position, by a user, of a virtual viewpoint image to be generated based on a plurality of images obtained by capturing an image capturing target area from directions different from one another by a plurality of image capturing apparatuses;
acquiring a second virtual viewpoint position information for specifying a second view direction to the position of interest to be included in the virtual viewpoint image and within the image capturing target area;
determining a movement path that starts at a first virtual viewpoint position corresponding to the first virtual viewpoint information, towards a second virtual viewpoint position corresponding to the second virtual viewpoint information, and includes one or more intermediate virtual viewpoints each specifying a view direction to the position of interest; and
controlling a virtual viewpoint to move from the first virtual viewpoint position and the first view direction to the second virtual viewpoint position and the second view direction along the determined movement path.

19. The information processing apparatus according to claim 9, wherein the specific distance is determined in accordance with a situation around the position of interest.

* * * * *